Sept. 24, 1968  V. P. CARDONE  3,402,981
GLARE REDUCED LIGHT RAY SCREEN
Filed Dec. 17, 1963  2 Sheets-Sheet 1
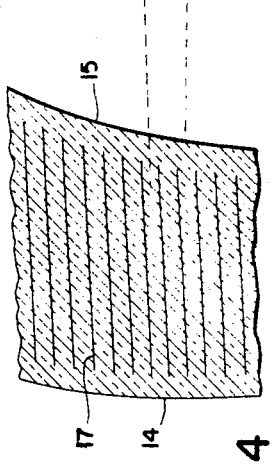
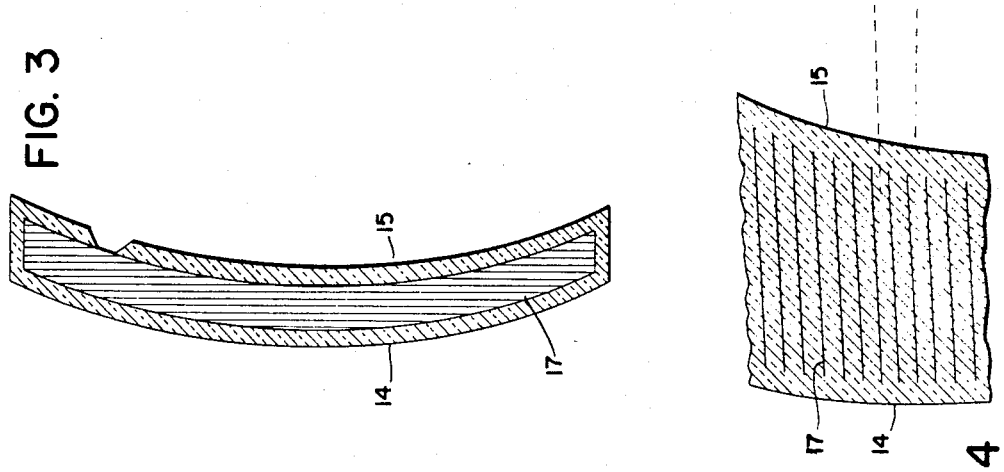
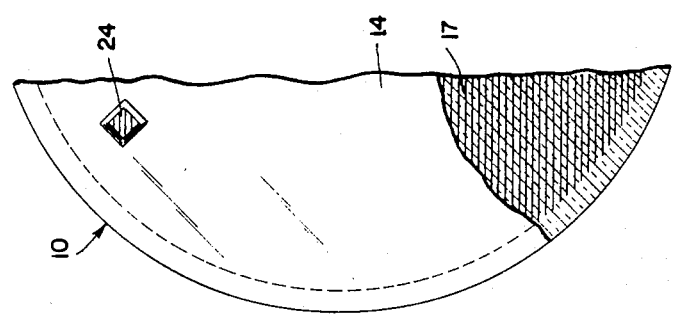
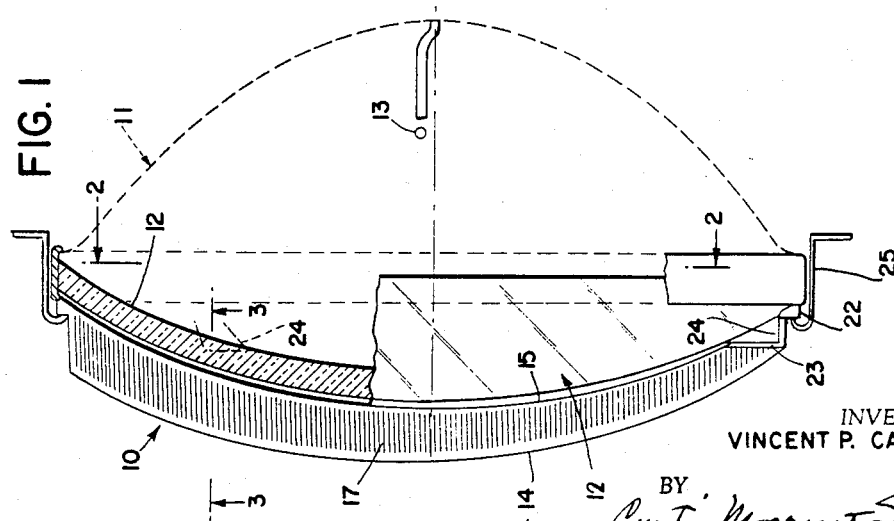
INVENTOR.
VINCENT P. CARDONE
BY Curtis, Morris & Safford
his ATTORNEYS Sept. 24, 1968          V. P. CARDONE          3,402,981
                  GLARE REDUCED LIGHT RAY SCREEN
Filed Dec. 17, 1963                          2 Sheets-Sheet 2
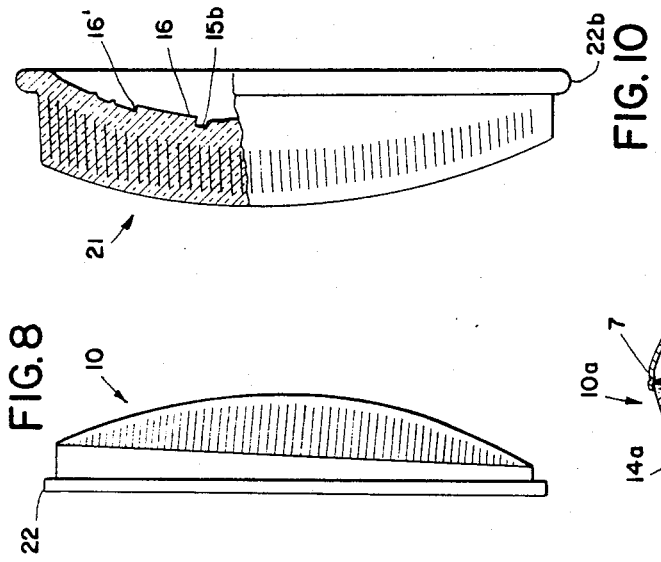
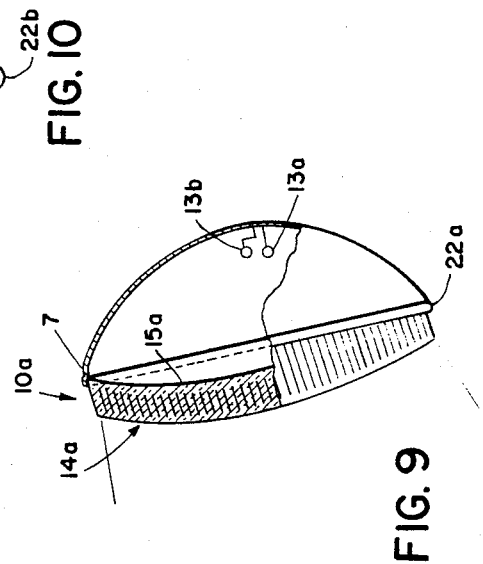
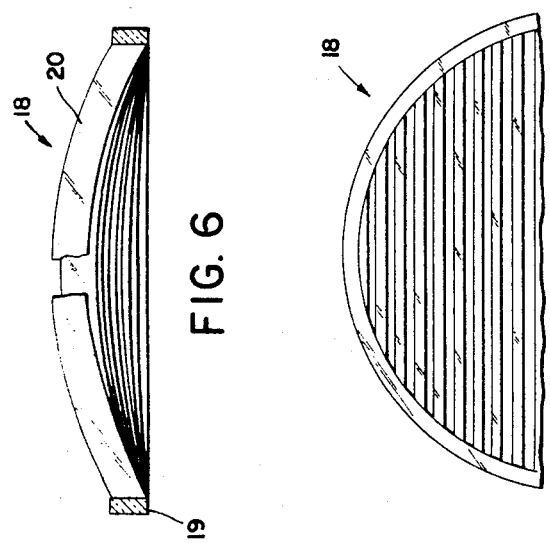
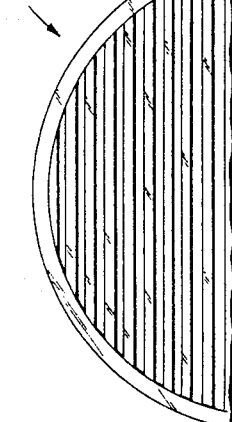
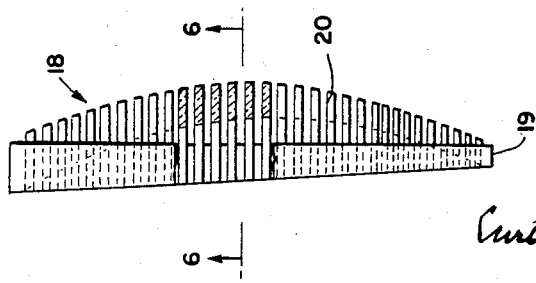
INVENTOR.
VINCENT P. CARDONE
BY
Curtis Morris & Safford
his ATTORNEYS

United States Patent Office 3,402,981
Patented Sept. 24, 1968

3,402,981
GLARE REDUCED LIGHT RAY SCREEN
Vincent P. Cardone, Levittown, N.Y., assignor of forty-nine percent to Stuart Mikelberg, Brooklyn, N.Y.
Filed Dec. 17, 1963, Ser. No. 331,173
4 Claims. (Cl. 350—276)

ABSTRACT OF THE DISCLOSURE

A glare reduced light ray screen particularly suited for use as vehicle headlights wherein the transparent light transmitting material is defined between a convex outer and a concave inner layer of substantial radius, flat parallel veins of a translucent color arranged in the light transmitting material, the veins having curved outer edges spaced from and substantially parallel with portions of the convex outer surface.

---

The present invention relates to a light ray screen and to a method of making the same.

I am aware that various expedients have been proposed to eliminate the dangerous glare commonly produced by vehicle headlights. In general, these have been less than fully effective. Thus, a known type of screen or filter element having fixed spaced louvers or light deflecting surfaces between light transmitting passageways is inadequate in that all rays of the beam are so intercepted by said beams that no satisfactory road illumination remains. In another form, a screen provided with spaced light deflecting surfaces between light transmitting passageways is controllably tiltable to vary the light effect of a beam passing through the screen. A device of this kind is not only expensive to produce but unsatisfactory in use.

An object of said invention has accordingly been to provide an inexpensive and more effective screen or light ray filter which can readily be attached to or incorporated in various types of vehicle or other lights to modify light beams emanating therefrom and so to control the direction or intensity thereof, or of portions thereof; or so that said beams or portions thereof may pass through said screen unimpeded and with full illuminating effect as viewed from certain angular positions and may appear in modified form or intensity and thus with reduced glare when viewed from other angular positions in relation to the light source.

As applied to vehicle headlights, an object of the invention is to suppress the glare effect of portions of the beam which otherwise appear with blinding intensity to persons in oncoming vehicles without, however, impairing the effectiveness of road lighting portions of the beam.

A further object has been to provide a light modifying device which can be produced in various forms, at moderate cost to meet different requirements and, when designed as an attachment, can readily be assembled with other elements of conventional vehicle lights for example.

A further object of the invention has been to provide a method for effectively and economically producing light screens or filters as aforesaid.

The invention as embodied in a light screen or filter comprises in general a rigid mass, as of plastic, glass or other suitable transparent material, defined between a convex outer surface and a concave inner surface. Said mass includes transparent light transmitting portions, or in effect, laminae defined by equispaced light ray modifying layers or veins each having a convex longitudinal edge substantially parallel with an opposed part of the outer one of said surfaces and a concave longitudinal edge substantially parallel with an opposed part of the inner one of said surfaces, said layers being arranged in parallel relation to each other and to the radial axis of said convex surface of the mass. Said ray modifying layers or veins are arranged with their longitudinal curved edges spaced from said outer and inner surfaces of the mass and are wholly enclosed therein. The width of said veins between said curved edges thereof in one form of screen is preferably on the order of 7:1 in relation to the space between adjacent veins.

In another embodiment as a screen for a vehicle headlight, said outer and inner surfaces of the screen define approximately spherical sections of substantially the same diameter and with the radial axis of said outer surface arranged at an angle to the corresponding radial axis of the inner sruface. In this embodiment the ratio of vein width to the uniform intervein dimension is a variable approximately between 7:1 at the bottom and 14:1 at the top of the screen when applied to or incorporated in a headlight lens.

The present invention so far as it pertains to a method of making the above noted screen includes in general the steps of producing a rigid blank of transparent plastic, glass or other suitable substance from a mass in plastic condition, said blank including a grating of flat sided spaced transparent parallel bars or partitions supported at their ends by a continuous peripheral wall, said bars having convexly curved outer edges and concavely curved inner edges; applying thereto a coating of a coloring agent, as dye, so that the opposed lateral faces of said grating bars retain a coating or layer of color but leaving the outer and inner edge surfaces of said partitions without applied color; and enveloping said blank in a mass of suitable transparent material, whereby the spaces between the coated faces of said bars also become in effect light transmitting laminae of transparent material.

Other objects and distinctive features of the present invention not above referred to will appear from the following specification and claims and from the accompanying drawings wherein is shown a preferred embodiment thereof incorporated in a light screen and parts thereof as described in said specification. The showing so made is not intended to be either exhaustive or as limiting the scope of the subject invention. The purpose here is to illustrate the invention so that others skilled in the art may so fully understand it, its principles and applications, that they may embody it and adapt it in any of various forms for the attainment of any particular or appropriate purpose in use.

In the drawings:

FIG. 1 is a view in central vertical section and with parts broken away of a screen assembly according to the invention, the screen being applied as an attachment to a conventional form of vehicle headlight element shown in part diagrammatically;

FIG. 2, a fragmentary rear view from the line 2—2 of FIG. 1 with parts broken away to show the arrangement of vertically spaced veins or thin layers of color defining between them light transmitting laminae or passageways through the screen mass;

FIG. 3, a horizontal section on the line 3—3 of FIG. 2 showing the placement of veins or color layers in the enveloping mass of transparent light transmitting material;

FIG. 4, a fragmentary vertical section on exaggerated scale showing typical placement of the color layers in relation to each other and to the outer and inner surfaces of the screen;

FIG. 5, a view in side elevation partly in section of a blank of transparent material as it appears at an intermediate stage of production and wherein the grating bars are in condition to receive layers of coating material, as dye, on their opposed side faces to provide the veins between transparent laminae of the finished screen;

FIG. 6, a transverse section on the line 6—6 of FIG. 5;

FIG. 7, a fragmentary top plan view of a portion of the blank shown in FIG. 6;

FIG. 8, a side elevation showing the finished screen;

FIG. 9, a side elevation, with parts broken away, showing a modification wherein the convex and concave surfaces of the screen are substantially parallel; and FIG. 10, a side view, partly in section, illustrating a form of combined lens and filter in a single integral unit.

Referring to the drawings, a light ray modifying screen 10 or 10a according to my invention as shown in FIGS. 1 and 9 is adapted to be attached to a conventional type of vehicle head light element 11, FIG. 1, having a lens 12 and a light source 13. Screen 10, FIG. 1 or 10a FIG. 9, comprises a rigid unitary mass of transparent or light transmitting material, as acrylic resin or other suitable plastic, glass, or the like, having a convex outer surface and a concave inner surface, said surfaces being in effect spherical segments based on the same radial dimensions. In the screen shown in FIG. 1, said surfaces 14 and 15 respectively are arranged with their radial axes angularly offset between 2° and 5° in a common vertical plane. In such case as where the angular offset is of the order of 2.7° for example, the thickness of the screen may vary from a minimum of ¼″ at its bottom edge to a maximum of ½″ at the top.

The screen 10a shown in FIG. 9 is of substantially uniform thickness and the convex surface 14a and concave surface 15a thereof are approximately in parallel arrangement.

It is contemplated that the equivalents of screen structures shown in FIGS. 1 or 9 and suitable as attachments to the light elements of vehicle lights, for example, may be incorporated in a single unit with the lens component as seen in FIG. 10. In such case, the inner or concave surface 15b is the inner generally concave surface of lens 12 and may be interrupted by such prismatic or other light modifying forms 16, 16′ as are commonly emlpoyed or suitable in headlight lenses for achieving various lighting effects.

As seen in FIGS. 1, 4 and 9, the screen 10, 10a includes within its transparent mass a plurality of equispaced light modifying translucent layers or veins 17 supplied by layers or coatings of a suitable coloring substance such as a fast dye, preferably one which neither produces nor undergoes any chemical change or reaction in relation to the transparent material of the screen mass at any stage of production. These veins in effect define between them light transmitting laminae or layers of the transparent material of the constituent mass. In an embodiment designed for vehicle headlight service, veins 17 (FIG. 4), will advantageously be spaced apart ⅟₃₂″ in vertical array and, in the arrangement shown in FIG. 1, will advantageously be about ⁷⁄₃₂″ wide, i.e., from front or convex curved edge to rear or concave curved edge at the bottom and increasingly wide toward the top, as seen in exaggerated degree in FIG. 4. Also, the front and rear edges of veins 17 stop short of or are spaced from the front and rear surfaces 14 and 15, respectively, said veins 17 being thus completely enveloped within the screen mass. Veins 17, as shown in FIG. 1, where the screen is associated with a vehicle headlight assembly, are arranged in parallel relation to a plane disposed at an angle to the horizontal and which includes the radial axis of the convex outer surface 14. Thus, in this environment, light rays in the beam emanating from the reflector and passing through lens 12 pass between the color coatings on said veins 17 substantially without impairment of the road illuminating effect of the transmitted rays while other portions of the light rays as seen through the veins appear when viewed from a higher level as tinted or reduced in intensity.

In a typical case the effect on a driver approaching such a screened headlight is to reduce glare therefrom without impairing illumination of the road. Assuming that such a headlight is carried at about 2′ above road level, the angle of an approaching driver's line of sight in relation to the axis of the headlight will increase, for example, from about 2° to about 5° or more as the intervening distance is diminished. Accordingly, the pitch of said veins 17 and their increasing width toward the top of the screen will be such as to provide increasing modification or screening of the light beam as viewed by the approaching driver without, however, impairing the road illuminating effect thereof for the driver of the car which carries the headlight.

The screen 10a, FIG. 9, may be employed advantageously in connection with rear lights where differential color effects one for tail light and another for backup, for example, are to be provided in a single unit and where the problem of glare is not involved. Thus, where a rear light includes two independently controllable light sources, as 13a and 13b, set in different angular relation to the veins 17, the screen 10a will advantageously replace the conventional lens and so display one or another color or intensity of light depending on which of said light source is energized. In the arrangement shown, source 13a will supply light for the tail light i.e. red; whereas source 13b will supply the backup light. It is contemplated that such a dual purpose device can materially reduce production costs at least to the extent that one set of rear lights will provide the combined effects of two sets of standard type lights.

According to a preferred method of making the above described screens, a mold is provided which will in use according to known techniques produce a rigid blank of transparent material such as acrylic resin. As seen in FIGS. 5, 6, and 7, such a blank 18 includes a peripheral wall 19 and, in effect, a grating having a plurality of equispaced parallel flat sided bars or partitions 20 which extend across the space between opposed portions of the said wall, FIG. 7.

The opposed flat sides of said bars are provided with a coating or thin layer of a colored translucent material to provide the veins 17. For this purpose, the blank 18 may be immersed in a solution or suspension of a suitable dye as aforesaid which is inert to the material of blank 18, such for example as acetate dyes or dyes known commercially as "Bacoplast" colors made by Bachmeier & Co., Inc., New York. That portion of the coating which is deposited on the outer and inner edge surfaces of bars 20 is removed in any suitable manner as by wiping, thus leaving the color coating on the opposed flat sides of said bars and permitting the unimpeded passage of light rays through said bars from inner to outer edges thereof.

Blank 18 of acrylic plastic with the flat sides of bars 20 color coated is now confined in a suitable mold of such dimensions and interior contour as to wholly enclose said blank in spaced relation to inner surfaces of the mold. A mass of acrylic plastic is introduced into this mold in a condition and in a manner to substantially fill the interior including all the interstices between said bars 20 and, when hard, to completely envelop said bars including their outer and inner edges and their supporting wall 19 in a rigid mass of transparent plastic. As seen in FIGS. 3 and 4, the color coatings on bars 20 become the veins or layers 17 betwen which are the transparent light transmitting portions of the screen including bars 20 as well as the filled in spaces between them.

In the case of a composite or unitary screen and lens 21, FIG. 10, the grating blank 18 with colored bar faces is produced as above described. This intermediate product is now confined in a suitable mold wherein portions are shaped to provide the prism-like or other inwardly directed forms as 16, 16′ in the resulting molded and hardened article.

As seen in FIGS. 1 and 8, the finished screen 10 includes a peripheral flange 22 and may also be formed with angularly spaced recesses 23 of a shape and dimension to receive similarly contoured bosses or posts 24, extending from the outer face of lens 12 in spaced angular relation. Thus, when screen 10 is attached to light element 11, the posts 24, preferably three in number, are engaged with correspondingly positioned recesses 23 thereby preventing relative rotation of screen 10 in relation to lens 12. The screen may be secured in said position on the headlight by suitable means such as a retaining ring 25, indicated diagrammatically in FIG. 1. Similarly, screen unit 10A, FIG. 9, includes a peripheral flange 22a; and the composite unit 21, FIG. 10, includes a peripheral flange 22b. In each instance, the peripheral flange is advantageously produced in the second of the two molding operations previously described.

I claim:

1. A light ray modifying screen comprising a rigid mass of transparent light transmitting material defined between a convex outer and a concave inner surface of substantially equal radius each having a substantially horizontal axis and spaced apart along said axis, a plurality of flat parallel colored translucent veins arranged in said mass extending horizontally and spaced apart vertically, said veins having curved outer edges spaced from and substantially parallel with portions of said convex outer surface opposed thereto and said veins having curved inner edges spaced from and substantially parallel with portions of said concave inner surface opposed thereto, the ratio between the edge to edge width of said veins and the space between them being not substantially less than 7:1, said veins being at an acute angle with the horizontal and having said inner edge higher than said outer edge.

2. Light ray modifying screen according to claim 1 wherein said axis of said outer convex surface is offset angularly in a common vertical plane from said axis of said inner concave surface.

3. Light ray modifying screen according to claim 2 and wherein the angular offset between the convex surface axis and the concave surface axis is between 2° and 5°.

4. A light ray modifying screen according to claim 2 wherein the colored veins are arranged in symmetrical relation to the vertical axis of the screen portion, said layers being of increasing width between their outer and inner curved edges from the bottom of said axis toward the top end thereof.

References Cited

UNITED STATES PATENTS 1,442,207   1/1923   Yardley.

JEWELL H. PEDERSEN, *Primary Examiner.*

B. LACOMIS, *Assistant Examiner.*